Oct. 27, 1953
H. A. WESTBY
2,656,852
PRESSURE COOKER VALVE
Filed June 5, 1947
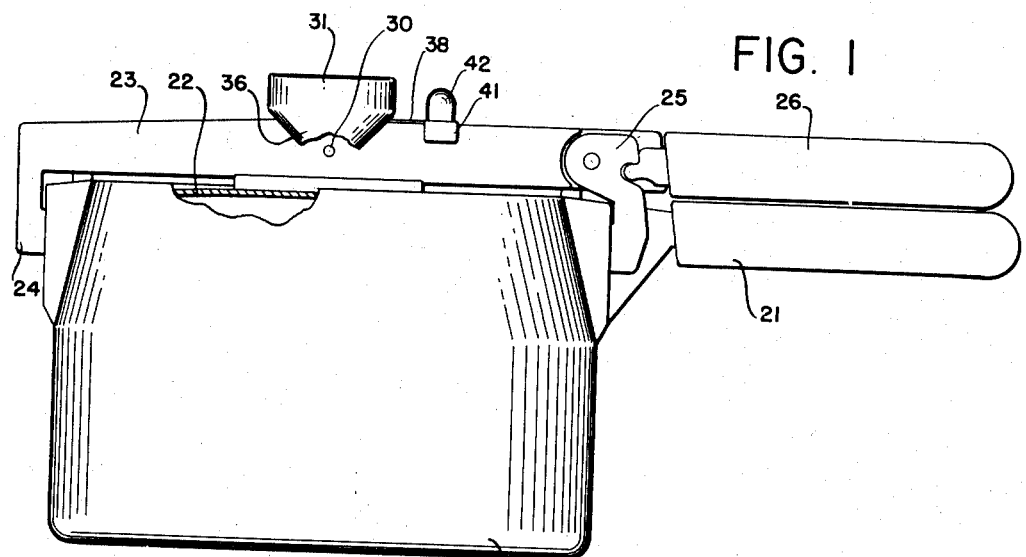
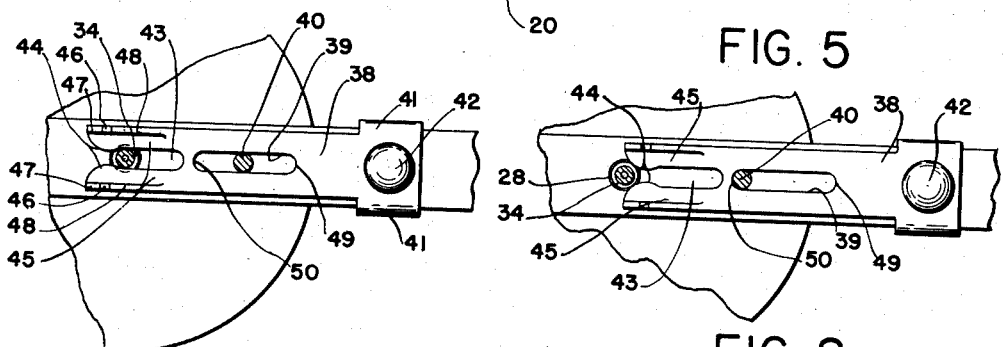
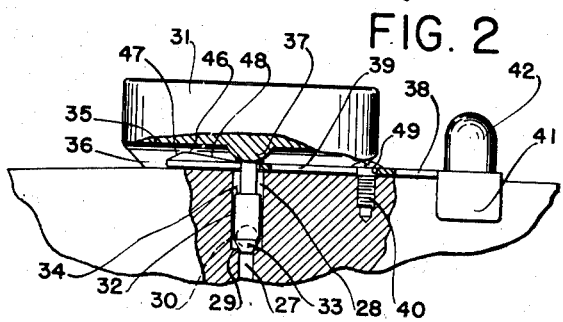
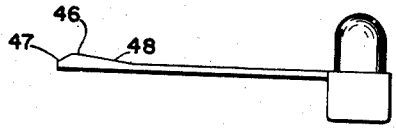
INVENTOR
HENRY ARNOLD WESTBY
BY *William C. Babcock*
ATTY.

Patented Oct. 27, 1953

2,656,852

UNITED STATES PATENT OFFICE 2,656,852

PRESSURE COOKER VALVE

Henry Arnold Westby, Minneapolis, Minn., assignor to General Mills, Inc., a corporation of Delaware Application June 5, 1947, Serial No. 752,735

9 Claims. (Cl. 137—523)

This invention pertains to pressure cookers and more particularly to an improved pressure release mechanism for such cookers.

It is well known in the pressure cooker art that some means must be provided to control the pressure within the cooker. Various control mechanisms have been suggested, some of which involve the use of a spring loaded relief valve, while others make use of a weighted valve which opens when the internal pressure overcomes the effect of gravity on the weighted member. The present invention includes features capable of use with either type of valve, but in its preferred form, it is particularly adaptable to weighted valves. Such valves are often dropped and damaged when the cooker is inverted or when the cover is removed. The present invention is designed to prevent such accidental removal.

It has also been proposed in the cooking art that some means should be provided to permit controlled release of the pressure at either a slow or rapid rate depending upon the particular food which is being cooked and the nature of the result desired. Previous devices for this purpose have involved the use of springs and threaded members and have been complicated and costly to manufacture and adjust. It is accordingly one object of the present invention to provide an improved pressure control and release mechanism for a pressure cooker.

It is another object of the invention to provide an improved pressure control mechanism for a cooker, in which controlled release of the pressure may be obtained.

It is a further object to provide a pressure relief valve which will be locked on the cooker even though the cooker is inverted, but which can be removed when necessary for cleaning purposes.

It is another object to provide a single movable member, which serves both to control the release of pressure and to lock the pressure control member on the cooker.

Other objects and advantages of the invention will be apparent from the following specification in which I have shown one embodiment thereof. In the drawings, wherein this preferred embodiment is shown, Figure 1 is a side elevation of a pressure cooker with certain portions broken away for clearness.

Fig. 2 is an enlarged partial side view of the cooker of Fig. 1, with portions of the pressure release mechanism shown in section.

Fig. 3 is a side elevation of the control member or slide exemplifying the present invention.

Fig. 4 is a partial top view of that portion of the cooker on which the slide is mounted, with the slide in open or pressure-releasing position, and Fig. 5 is a view similar to Fig. 4 with the slide in unlocked position whereby the pressure control member may be removed for cleaning or storage.

In these drawings, wherein like reference characters indicate like parts, I have shown one form of my invention in a pressure cooker which consists of a suitable pot 20 provided with a carrying handle 21. Any desired form of cover 22 may be used and I have shown said cover fastened to a supporting cross bar 23, one end of which has a hooked portion 24 adapted to engage a suitable seat or recess on the pot 20. At the other end of the cross bar 23 a pivoted latch 25 has been provided, and the handle 26 is connected to said latch so as to operate the same. This cover latching mechanism is fully described and claimed in the co-pending application of Clifford C. Schweiso entitled Safety Mechanism for Pressure Cookers, Serial No. 24,764, filed May 3, 1948, now U. S. Patent 2,599,072, which is assigned to the same assignee as the present invention. Since the particular type of latching mechanism forms no part of the present invention, it will not be described in detail herein. Any other suitable fastening means for the cover supporting member could be used.

The supporting cross bar 23 and cover 22 are provided with a vertical passageway 27, best shown in Fig. 2. The inner end of this passageway communicates with the interior of the cooker so that the pressure within the passageway will be substantially the same as that in the cooker.

As shown in Fig. 2 the upper or outer portion of passageway 27 is enlarged as at 28 in order to provide a valve seat 29 at an intermediate portion of the passageway. Just above the valve seat 29 lateral openings 30 are provided intersecting the enlarged portion 28 of the passageway 27 to provide a path for the escape of steam to the atmosphere. Preferably, two such passages 30 are provided, one at each side of supporting cross bar 23.

The pressure control member or valve 31 may be of any desired construction and may include a pressure gauge if desired. As shown in the drawings this pressure control member 31 is in the form of a weight which has a depending stem 32 for insertion downwardly into the enlarged portion 28 of the passageway 27. The lower portion of stem 32 is of conical shape as shown at 33 and forms a valve portion adapted to cooperate with the valve seat 29. Thus, this valve portion 33 will engage the seat 29 to close passageway 27 and prevent escape of steam during the normal cooking operation. Should the steam pressure exceed a certain predetermined value, such pressure would overcome the effect of gravity on control member 31 and would lift the control member and its stem 32 so that valve 33 would no longer engage tightly against the valve seat 29. Steam would then be free to escape through the lateral openings 30 to the atmosphere. As soon as sufficient steam has escaped so that the pressure is again reduced to the normal cooking value, the control member 31 would drop under the influence of gravity so that valve 33 would engage valve seat 29 to close passageway 27.

The upper portion of stem 32 is reduced in diameter as shown in order to provide an inner abutment or shoulder 34 which will cooperate with the locking or retaining means to be described. This reduced portion is of sufficient length so that it allows the necessary vertical movement of stem 32 to open and close the valve.

The central portion of the pressure control member 31 is substantially flat and parallel to the top of the supporting cross bar 23, as shown as 35. The lateral portions of the control member may, if desired, be extended downwardly as shown at 36 so as to overlap the sides of the cross bar and conceal the relief openings 30.

Details of construction of such a pressure control member are described and claimed in the co-pending application of Clifford C. Schweiso entitled Pressure Cooker Relief Valve, Serial No. 24,763, filed May 3, 1948, now U. S. Patent 2,620,086, which is assigned to the same assignee as the present invention.

The center of the lower horizontal surface 35 of the relief member is provided with a pair of downward projections 37, one on each side of the stem. These projections are shown in the form of a smooth curve and are adapted to cooperate with cam surfaces to be described, for lifting the control member 31 manually to release the pressure.

A manual control slide 38 is provided to cooperate with the pressure weight 31 in order to release the pressure within the cooker whenever desired by the operator. This slide 38 is mounted on the supporting cross bar 23 of cover 22 and is adapted to reciprocate longitudinally along said cross bar. In order to fasten the slide 38 to the cross bar and limit its longitudinal movement, the slide has been provided with a slot 39 through which a retaining screw 40 may be threaded into the cross bar. The head of screw 40 will prevent the removal of slide 38 from the cross bar and at the same time will permit sliding movement of the bar within the limits set by the dimensions of the slot 39.

The slide 38 is further provided with a pair of downwardly projecting tabs or ears 41, one of which is positioned at each side of the cross bar. These ears 41 further limit the possible movement of the slide 38 so that it can not pivot about screw 40 but can merely slide longitudinally of the cross bar 23 within the limits set by slot 39.

A suitable projection 42 on the slide 38 serves as a convenient knob for manipulation by the user of the cooker. This knob may be made of plastic or other suitable heat insulating material to prevent burning the fingers of the user, and is fastened to slide 38 in any desired manner.

The slide 38 is further provided with an additional slot 43 at its other end, said slot being formed between two parallel end portions 45 of the slide. Thus the slot is closed only at its inner end. The outer end of the slot is open but is slightly narrowed by reason of inwardly curved portions 44 on each of the parallel ends 45. Slot 43 has a width just slightly greater than the diameter of the reduced portion of stem 32 on the pressure control member 31. Thus, this reduced portion may fit freely within the slot, but when positioned as shown in Fig. 2 or 4, the slot is too narrow to permit passage of the abutment 34 on stem 32. In other words, abutment 34 on stem 32 cooperates with slide 38 to prevent inadvertent removal of the control member 31 from the cooker.

The distance between curved portions 44 at the outer end of slot 43 is slightly less than the diameter of the reduced portion of stem 32. Thus when said reduced portion is in the slot, movement of the slide 38 to the right will be limited as shown in Fig. 4 by engagement of portions 44 against said reduced portion. The two parallel ends 45 on each side of slot 43 are of suitable thickness and resilience to permit their lateral deformation, when substantial additional force is exerted on slide 38 to move it to the right to the position shown in Fig. 5. In other words, portions 44 will normally serve as stops to limit the movement of the slide to the right, so that the parallel ends 45 will cooperate with shoulder 34 to prevent inadvertent removal of the pressure weight 31. However, if it is desired to remove the pressure control member 31 (for example, in order to clean the passage 27 or 28), the slide 38 can be forced all the way to the right until the left end 50 of slot 39 engages screw 40 to limit further movement in that direction. (See Fig. 5.)

In this latter position, the bifurcated ends 45 of slide 38 have been resiliently sprung apart in order to pass the reduced portion of stem 32. In this extreme right position of slide 38, both the reduced portion of the stem and the abutment or shoulder 34 are clear of the bifurcated ends 45, so that the pressure control member 31 may be lifted vertically from the cooker and removed completely from passageway 28. It will be noted that the outer ends of portions 45 diverge substantially, to provide a widened or clear portion which provides the necessary clearance. After the passageway has been cleaned and it is again desired to mount the control member 31 on the cooker, the slide can be held in the position of Fig. 5 while the stem 32 is reinserted in passage 28. Slide 38 is then moved to the left to the position of Fig. 4 or Fig. 2, in the course of which movement the ends 44 of arms 45 are sprung apart sufficiently to permit entrance of the reduced portion of the stem into slot 43.

Slide 38 is further provided with suitable cam surfaces for engagement with the projections 37 on the under side of control member 31. In the embodiment shown in the drawings these cam surfaces are formed on the parallel ends 45 of the slide. As indicated, the cam surfaces include a substantially horizontal raised portion 46 and sloping portions 47 and 48 adjacent thereto. These sloping portions may be formed with any desired angle, either gradual or sharp, in order that the control member 31 may be lifted slowly or rapidly to the extent desired by the operator.

I prefer to make the portion 48 with a relatively gradual or gentle slope as shown in the drawings in order that the amount of opening of valve 33 with respect to seat 29 may be very closely and accurately controlled by movement of the slide 38. In other words, a relatively large movement of the slide will then be required to cause a slight or limited movement of the valve. This makes possible greater accuracy of control so that the pressure may be released at any desired rate.

In the position of the parts shown in Fig. 2, slide 38 is in its extreme left position as limited by engagement of screw 40 against end 49 of slot 39. The pressure weight 31 is in its lower position with valve 33 engaging valve seat 29 to close passage 27. It is apparent that movement of the slide 38 to the right toward the position of Fig. 4 will cause engagement of cam surfaces 48 against projections 37 and will thus gradually lift the weight 31 so that valve 33 is spaced from valve seat 29 to permit escape of steam to the atmosphere through ports 30. When the slide 38 has been moved completely into the position of Fig. 4, so that further movement is limited by engagement of narrowed portions 44 of slot 43 with stem 34, the flat portions 46 of the cams will be in engagement with projections 37 and will hold the weight 31 and valve 33 in their uppermost position relative to the valve seat 29.

It should be noted that the valve is locked in position by reason of the fact that the shoulder 34 of stem 32 can not pass through slot 43, either in the cooking position of Fig. 2 or in the pressure releasing position of Fig. 4. Only by the exertion of additional force to deform temporarily the parallel ends 45 and move the slide 38 all the way to the right to the position of Fig. 5, is it possible to free the valve stem completely so that the control member 31 may be withdrawn from the cooker. In other words, the manual control slide has two normal limiting positions, one for cooking, and one for release of pressure, and a third or cleaning position. Only in this third position can the pressure control valve be removed. And the resiliently deformable stops 44 prevent accidental movement of the slide to this third position.

Thus, it will be seen that I have provided a relatively simple mechanism for control of the pressure in a cooker and that my improved device serves not only to permit controlled bleeding of the pressure within the pot but also serves the additional important function of retaining the pressure control member on the cooker at all times and in all positions of the cooker, except when it is desired to remove the control member for cleaning or for some other purpose. Furthermore, both these functions; namely, controlled release of pressure, and prevention of accidental removal of the control valve, are performed by a single, easily manufactured manual slide.

Since obvious changes in the specific construction will occur to those workers skilled in this field, it is not my intention to limit this invention to the structural details shown in the drawing. All such equivalents as fall within the spirit and scope of the attached claims are contemplated as a part of the invention.

Now, therefore, I claim:

1. In a pressure cooker, the combination of a removable pressure relief valve movable between open and closed positions, and a manually operable control member for said valve, interengaging means on said valve and member moving said valve from closed to open position when said member is moved from a first to a second position, and locking means on said member positioned in the path of said valve in at least one position of said member for preventing accidental removal of said valve.

2. In a pressure cooker the combination of a removable pressure relief valve movable between open and closed position, a manually operable control member for said valve, interengaging means on said valve and member moving said valve from closed to open position when said member is moved from a first to a second position, and locking means on said member positioned in the path of said valve in at least the second position of said member and thereby preventing accidental removal of the valve when said member is in said second position.

3. In a pressure cooker the combination of a removable pressure relief valve movable between open and closed positions, a manually operated control member for said valve mounted for movement to and from a first position, interengaging means on said member and valve positively opening the latter when said member is moved to said first position, locking means on said member positioned in the path of removal of said valve when the control member is in its first position and thereby preventing removal of the valve when said member is in said first position, said member being movable to a further position in which said locking means is out of the path of said valve, and stop means normally resisting movement of said member to said further position.

4. In a pressure relief valve assembly having a body member provided with a pressure relief opening and a pressure relief valve mounted on said body for movement between a closed position in which the valve closes the relief opening and an open position in which the valve permits relief of pressure through the opening, said valve being free from direct attachment to said body and thereby freely removable from the body along a given path, the improvement comprising a manually operable control member for the valve, said control member being mounted for movement between first and second positions and being operatively connected to the valve for movement of the valve from closed to open position in response to movement of the control member from first to second position, said valve having an abutment facing along said path, and said control member having a locking portion in the path of removal of said abutment and thereby preventing accidental removal of the valve in at least one position of the control member, said locking portion being movable out of the path of removal of said abutment by movement of the control member to at least one other position thereby providing for intentional removal of the valve from the body along said given path when the control member is in said one other position.

5. In combination, a pressure relief valve having a body member with an upwardly facing pressure relief valve seat, a pressure control weight having a valve normally engaging and closing said valve seat but movable upwardly in response to excessive pressure for opening the seat and automatic relief of such pressure, the control weight being readily removable from the seat along a given path and having an abutment facing away from the seat along said path, and a manual operating member mounted for movement from first to second positions in a direction intersecting said path, interengaging cam means on the operating member and control weight automatically lifting the weight and valve away from the seat from closed to open position in response to movement of the operating member from first to second position and permitting the weight to fall to closed position when the operating member is in said first position, and locking means on said control member lying in the path of the abutment when the manual operating member is in said second position and thereby constituting the sole retaining means preventing inadvertent removal of the pressure weight, said operating member being movable to at least one position in which said locking means is out of the path of said abutment for intentional removal of the weight.

6. A pressure relief valve according to claim 5 in which said locking means is located in the path of removal of the abutment in both the first and second positions of the operating member, and in which the latter is movable to a third position in which said locking means is out of the path of the abutment.

7. A pressure relief valve according to claim 6 having stop means normally permitting movement of the operating member between said first and second positions but preventing accidental movement of the operating member to said third position, the stop means being movable by application of force to the operating member for intended movement of the latter to said third position.

8. In combination, a pressure relief valve having a body member with an upwardly facing pressure relief valve seat, a pressure control weight having a valve stem normally engaging and closing said valve seat but movable upwardly in response to excessive pressure for opening the seat and automatic relief of such pressure, the control weight being vertically readily removable from the seat along a given path axially of the stem and having an abutment projecting laterally on the stem and facing away from the seat along said path, and a manual operating member mounted for substantially horizontal sliding movement in a direction extending across said path, the operating member having two spaced arms providing a slot therebetween through which the valve stem normally projects, the outer ends of the arms being closer together than the diameter of the stem and normally limiting movement of the operating member from a first position in which the stem is at the other end of the slot to a second position in which the arm ends engage the stem, said arm ends being resiliently separable in response to force applied to the operating member for intentional movement of the operating member past said second position to a third position, and interengaging cam means on the operating member and weight lifting the weight and valve stem to open position in response to movement of the operating member from first to second position and permitting lowering of the weight and valve stem to closed position when the operating member is in said first position, the operating member having a locking portion located above and in the path of removal of said abutment when the operating member is in both its first and second positions, said locking portion being retracted out of the path of said abutment when the operating member is moved to said third position.

9. In a pressure relief valve assembly having a body member provided with a pressure relief opening and a pressure relief valve mounted on said body for movement between a closed position in which the valve closes the relief opening and an open position in which the valve permits relief of pressure through the opening, said valve being removable from the body along a given path, the improvement comprising a manually operable control member for the valve, said control member being mounted for movement between first and second positions and being operatively connected to the valve for movement of the valve from closed to open position in response to movement of the control member from first to second position, said valve having an abutment facing along said path, and said control member having a locking portion in the path of removal of said abutment and thereby preventing accidental removal of the valve, said control member being movable to at least one position in which the locking portion is out of the path of removal of the abutment, thereby providing for intentional removal of the valve, and stop means normally resisting movement of the control member to the position in which said portion is out of the path of the abutment.

HENRY ARNOLD WESTBY.

References Cited in the file of this patent

UNITED STATES PATENTS

| Number | Name | Date |
| --- | --- | --- |
| 972,653 | Scheuerman | Oct. 11, 1910 |
| 1,418,530 | Burnahm | June 6, 1922 |
| 1,933,740 | Kuwoda | Nov. 7, 1933 |
| 2,049,158 | Eckert | July 28, 1936 |
| 2,200,903 | Stephens | May 14, 1940 |
| 2,245,946 | Vermere | June 17, 1941 |

FOREIGN PATENTS

| Number | Country | Date |
| --- | --- | --- |
| 78,173 | Austria | Sept. 10, 1919 |
| 406,391 | Great Britain | Mar. 1, 1934 |
| 559,659 | Germany | Sept. 22, 1932 |